United States Patent
Sung (10) Patent No.: US 8,964,260 B2
(45) Date of Patent: Feb. 24, 2015

(54) METHOD OF CONTROLLING SCAN SPEED OF SCANNER INCLUDING AUTOMATIC DOCUMENT FEEDER AND SCANNER PERFORMING THE SAME

(71) Applicant: Samsung Electronics Co., Ltd., Suwon-si, Gyeonggi-do (KR)

(72) Inventor: Byung-jun Sung, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 14/022,758

(22) Filed: Sep. 10, 2013

(65) Prior Publication Data
US 2014/0104662 A1   Apr. 17, 2014

Related U.S. Application Data

(60) Provisional application No. 61/714,788, filed on Oct. 17, 2012.

(30) Foreign Application Priority Data

Feb. 14, 2013   (KR) .................. 10-2013-0016061

(51) Int. Cl.
   *H04N 1/04*   (2006.01)
   *H04N 1/12*   (2006.01)
   (Continued)

(52) U.S. Cl.
   CPC ........... *H04N 1/121* (2013.01); *H04N 1/00278* (2013.01); *H04N 1/00347* (2013.01);
   (Continued)

(58) Field of Classification Search
   CPC .......... H04N 2201/04756; H04N 2201/02439; H04N 2201/04794; H04N 1/32448; H04N 2201/04755; H04N 1/0473; H04N 1/12; H04N 1/40; H04N 2201/329; H04N 1/486; H04N 1/3248; H04N 1/393; H04N 1/00435; H04N 1/324
   USPC ......... 358/474, 448, 498, 451, 462, 496, 501, 358/518, 520, 521, 1, 15; 382/162, 298, 382/305, 312, 313, 317, 318; 399/396, 167, 399/182, 210, 297, 368
   See application file for complete search history.

(56) References Cited

U.S. PATENT DOCUMENTS

| 5,084,741 A * | 1/1992 | Takemura et al. ............ 399/373 |
| 5,117,266 A * | 5/1992 | Takemura et al. ............ 399/373 |

(Continued)

FOREIGN PATENT DOCUMENTS

| EP | 0 617 544 | 3/1994 |
| JP | 7-322016 | 12/1995 |

(Continued)

OTHER PUBLICATIONS

Extended European Search Report issued Feb. 25, 2014 in corresponding European Patent Application No. 13188837.2.

(Continued)

*Primary Examiner* — Negussie Worku
(74) *Attorney, Agent, or Firm* — Staas & Halsey LLP (57) ABSTRACT

A scanner including an automatic document feeder includes a communication interface unit to perform a communication with an external printer; a scan operation performing unit to perform a scan operation; an automatic feeding unit to automatically feed scan-target documents to the scan operation performing unit; and a controller to control the scan operation and a scan speed, wherein when the communication interface unit receives a request speed for a scan operation from the external printer, the controller adjusts a feeding interval between the scan-target documents that are fed from the automatic feeding unit, so that the scan operation is performed at the received request speed.

22 Claims, 8 Drawing Sheets

(51) Int. Cl.
   *H04N 1/00* (2006.01)
   *H04N 1/047* (2006.01)
   *H04N 1/32* (2006.01)
   *H04N 1/36* (2006.01)

(52) U.S. Cl.
   CPC ....... *H04N1/00822* (2013.01); *H04N 1/00933* (2013.01); *H04N 1/0476* (2013.01); *H04N 1/32117* (2013.01); *H04N 1/36* (2013.01); *H04N 2201/0074* (2013.01); *H04N 2201/0081* (2013.01)
   USPC ............ 358/474; 358/498; 382/313; 399/182

(56) References Cited

U.S. PATENT DOCUMENTS

| | | | |
|---|---|---|---|
| 6,029,970 A | 2/2000 | Hwang | |
| 6,292,594 B1* | 9/2001 | Iwai | 382/298 |
| 6,661,541 B1* | 12/2003 | Chang | 358/474 |
| 6,741,823 B2* | 5/2004 | Yamakama | 399/167 |
| 7,616,353 B2* | 11/2009 | Yamanaka et al. | 358/474 |
| 7,800,793 B2* | 9/2010 | Wang | 358/474 |
| 7,852,494 B2* | 12/2010 | Asai | 358/1.1 |
| 7,924,475 B2* | 4/2011 | Suzuki | 358/474 |
| 8,064,106 B2* | 11/2011 | Ishido | 358/474 |
| 8,134,737 B2* | 3/2012 | Sai et al. | 358/1.16 |
| 8,229,315 B2* | 7/2012 | Sakai | 399/85 |
| 8,345,330 B2* | 1/2013 | Kanno et al. | 358/505 |
| 8,355,183 B2* | 1/2013 | Wang | 358/474 |
| 8,363,290 B2* | 1/2013 | Shinno et al. | 358/498 |
| 8,717,645 B2* | 5/2014 | Katto et al. | 358/498 |
| 2003/0081253 A1 | 5/2003 | Sekiguchi et al. | |
| 2005/0135853 A1 | 6/2005 | Ide et al. | |
| 2007/0008576 A1 | 1/2007 | Hayashi et al. | |
| 2009/0051951 A1 | 2/2009 | Saida | |
| 2009/0086286 A1* | 4/2009 | Tojo | 358/488 |
| 2009/0201561 A1* | 8/2009 | Hwang | 358/498 |
| 2011/0205604 A1 | 8/2011 | Imaizumi et al. | |

FOREIGN PATENT DOCUMENTS

| | | |
|---|---|---|
| JP | 9-294185 | 11/1997 |
| JP | 2004-201229 | 7/2004 |
| JP | 2006-7736 | 1/2006 |
| JP | 4345019 | 7/2009 |
| KR | 10-0224601 | 7/1999 |

OTHER PUBLICATIONS

International Search Report issued Feb. 18, 2014 in corresponding International Patent Application No. PCT/KR2013/009173.

* cited by examiner

| ID | | | Data (Data2 ~ Data4) | Check Sum |
|---|---|---|---|---|
| Type | Case | Length | | |
| 4bit | 2bit | 2bit | 1Byte ~ 3Bytes | 1Byte |

FIG. 5

| Comment | Data1 | Data2 | Data3 | Data4 | Check Sum |
|---|---|---|---|---|---|
| Requested Speed | 0xb7 | 0x01 | Requested Speed | | |
| Selected Scan Speed | 0xd7 | 0x02 | Scan Speed | | |
| Ack | 0xa4 | | | | |
| Nak | 0xa0 | | | | |

METHOD OF CONTROLLING SCAN SPEED OF SCANNER INCLUDING AUTOMATIC DOCUMENT FEEDER AND SCANNER PERFORMING THE SAME

CROSS-REFERENCE TO RELATED APPLICATIONS

This application claims the benefit of U.S. Patent Provisional Application No. 61/714,788, filed on Oct. 17, 2012, in the U.S. Patent and Trademark Office, and the benefit of Korean Patent Application No. 10-2013-0016061, filed on Feb. 14, 2013, in the Korean Intellectual Property Office, the disclosures of which are incorporated herein in their entirety by reference.

BACKGROUND

1. Field

The present disclosure relates to a method of controlling a scan speed of a scanner including an automatic document feeder and a scanner performing the method.

2. Description of the Related Art

Recently, scanners including an automatic document feeder are generally used, and an image forming system performing a function of a multi-function printer is made by connecting the scanners including the automatic document feeder with a plurality of printers. A scanner included in such an image forming system performs a scan operation according to a request of a printer, and the printer performs an operation of printing scan data when the scanner transmits the scan data to the printer.

A scan speed of a scanner is determined according to the performance of an image sensor and a driving motor, and a supportable scan speed is limited according to a scan mode. However, a plurality of printers that are connected to the scanner support different printing speeds due to a difference in the performance of their respective print engines.

Accordingly, the scanner may not effectively cope with various printing speeds of the plurality of printers, and thus an operation efficiency of the image forming system may deteriorate.

SUMMARY

The present disclosure provides a method of controlling a scan speed of a scanner including an automatic document feeder, in response to a request of various scan speeds.

The present disclosure also provides a scanner performing the method.

Additional aspects and/or advantages will be set forth in part in the description which follows and, in part, will be apparent from the description, or may be learned by practice of the invention.

According to an aspect of the present disclosure, there is provided a scanner including an automatic document feeder, the scanner including: a communication interface unit to perform a communication with an external printer; a scan operation performing unit to perform a scan operation; an automatic feeding unit to automatically feed scan-target documents to the scan operation performing unit; and a controller to control the scan operation and a scan speed, wherein when the communication interface unit receives a request speed for a scan operation from the external printer, the controller adjusts a feeding interval between the scan-target documents that are fed from the automatic feeding unit, so that the scan operation is performed at the received request speed.

The controller may include: a feeding interval calculator to calculate the feeding interval between the scan-target documents to make a scan speed of the scanner correspond with the received request speed; and a feeding interval controller to control the automatic feeding unit to feed the scan-target documents according to the calculated feeding interval.

The controller may further include a speed selector to determine whether there is a basic setting speed corresponding with the received request speed from among one or more basic setting speeds which are supported by the scanner and select a basic setting speed, which is higher than the received request speed, if it is determined that there is no basic setting speed corresponding with the received request speed, wherein the feeding interval calculator calculates the feeding interval when the scan speed corresponds with the received request speed while maintaining a scan time for each document according to the basic setting speed selected by the speed selector.

When there are two or more basic setting speeds that are higher than the received request speed, the speed selector may select the lowest basic setting speed from among the two or more basic setting speeds.

The basic setting speed may be a scan speed which the scanner supports without adjusting the feeding interval.

The communication interface unit may transmit a scan speed adjusted according to the calculated feeding interval to the printer.

The communication interface unit may receive a scan speed corresponding to a printing speed of the printer as the request speed.

The communication interface unit may receive a data packet including the request speed from the printer, and the data packet may include an identifier (ID) indicating what apparatus the data packet is transmitted from, data indicating a speed, and a check sum indicating whether there is a loss of the data.

The automatic feeding unit may include a pickup roller that picks the scan-target documents up, and the feeding interval controller may adjust a cycle, on which the pickup roller contacts the scan-target documents, according to the calculated feeding interval.

According to another aspect of the present disclosure, there is provided a method of controlling a scan speed of a scanner including an automatic document feeder, the method including: receiving a request speed for a scan operation from an external printer; calculating a feeding interval between scan-target documents to make the scan speed of the scanner correspond with the received request speed; performing a scan operation by automatically feeding the scan-target documents according to the calculated feeding interval; and transmitting a result obtained by the scan operation to the printer.

The calculating of the feeding interval may include: determining whether there is a basic setting speed corresponding with the received request speed from among one or more basic setting speeds that are supported by the scanner; if it is determined that there is no basic setting speed corresponding with the received request speed, selecting a basic setting speed that is higher than the received request speed; adjusting a scan speed by changing the feeding interval while maintaining a scan time for each document according to the selected basic setting speed; and calculating the feeding interval when the adjusted scan speed corresponds with the received request speed.

The selecting of the basic setting speed may include: if there are two or more basic setting speeds that are higher than the received request speed, selecting the lowest basic setting speed from among the two or more basic setting speeds.

The basic setting speed may be a scan speed which the scanner supports without adjusting the feeding interval.

The method may further include transmitting a scan speed adjusted according to the calculated feeding interval to the printer.

The receiving of the request speed may include receiving a scan speed corresponding to a printing speed of the printer as the request speed.

The receiving of the request speed may include receiving a data packet including the request speed from the printer, wherein the data packet includes an identifier (ID) indicating what apparatus the data packet is transmitted from, data indicating a speed, and a check sum indicating whether there is a loss of the data.

The performing of the scan operation may include adjusting a cycle, on which a pickup roller for picking the scan-target documents up from the automatic document feeder contacts the scan-target documents, according to the calculated feeding interval.

According to another aspect of the present disclosure, there is provided a non-transitory computer readable recording medium having recorded thereon a program for executing the method.

According to the present disclosure, a scan speed may be controlled in response to a request of various scan speeds by adjusting a feeding interval between scan-target documents that are fed by an automatic document feeder of a scanner, and thus, an operation efficiency of an image forming system may be improved.

BRIEF DESCRIPTION OF THE DRAWINGS

The above and other features and advantages of the present disclosure will become more apparent by describing in detail exemplary embodiments thereof with reference to the attached drawings in which.

DETAILED DESCRIPTION

The present disclosure will now be described more fully with reference to the accompanying drawings, in which exemplary embodiments of the present disclosure are shown, wherein like reference numerals refer to the like elements throughout.

Figure 1:
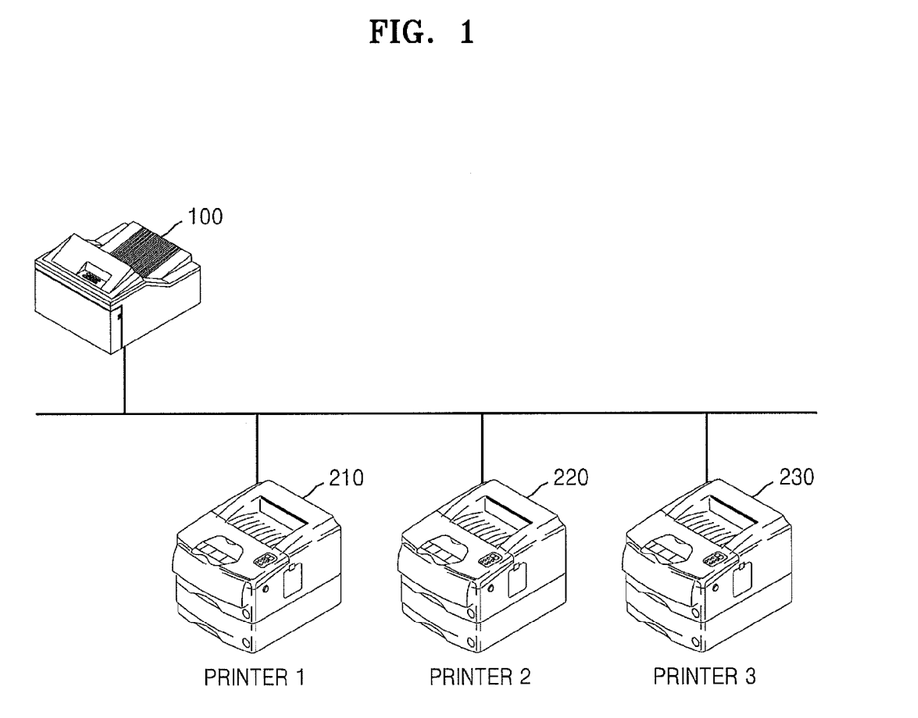
FIG. 1 is a diagram illustrating an image forming system in which a scanner including an automatic document feeder is connected to a plurality of printers, according to an embodiment of the present disclosure.

FIG. 1 is a diagram illustrating an image forming system in which a scanner 100 including an automatic document feeder is connected to a plurality of printers 210, 220, and 230, according to an embodiment of the present disclosure. Referring to FIG. 1, in the image forming system according to the embodiment, the plurality of printers 210, 220, and 230 may be connected to the single scanner 100. The scanner 100 performs a scan operation with respect to scan-target documents. When scan data obtained as a result of the scan operation is transmitted to any one of the plurality of printers 210, 220, and 230, a printer receiving the scan data may perform an operation of printing the received scan data. In this case, a request for a scan operation may be directly received from a user through a user interface included in the scanner 100.

A scan speed of the scanner 100 may be determined according to the performance of an image sensor, such as a charge coupled device (CCD) or a contact image sensor (CIS) and the performance of a driving motor, and may be set differently according to a scan mode. The scan mode is referred to a mode in which it is determined whether images of scan data are black and white or color and a resolution of the images is determined. The scan speed that is determined according to the performance of the scanner 100 may be limitedly supported according to the scan mode. A scan speed that is limitedly supported by the scanner 100 is referred to as a basic setting speed of the scanner 100. For example, if the scanner 100 supports a scan speed of 10 images per minute (ipm), 20 ipm, and 30 ipm for each scan mode, the basic setting speed of the scanner 100 includes 10 ipm, 20 ipm, and 30 ipm. That is, the basic setting speed means a scan speed which the scanner 100 basically supports without adjusting a feeding interval between scan-target documents.

The plurality of printers 210, 220, and 230 support different printing speeds according to the performance of their respective print engines. When it is assumed that a first printer 210 prints scan data transmitted from the scanner 100, if a printing speed of the first printer 210 is slower than a basic setting speed that is supported by the scanner 100, the scan data should be stored in a storage medium included in the printer 210, and then the stored scan data should be printed. If the storage medium in which the scan data is stored is a random access memory (RAM) included in the first printer 210, the printing speed is virtually not influenced. However, if the storage medium is a hard disk drive (HDD), the printing speed is influenced by the performance of an interface that is used for a compression of the scan data or the transmission of the scan data. On the contrary, if the printing speed of the first printer 210 is faster than the basic setting speed that is supported by the scanner 100, the printer 210 does not perform continuous print operations and should wait for scan data to be transmitted from the scanner 100, and thus, the printing speed slows down.

In this manner, since the scanner 100 supports a limited basic setting speed, it does not effectively cope with various scan speeds that are requested by the plurality of printers 210, 220, and 230, and thus the efficiency of an overall image forming operation may deteriorate. In order to solve such a problem, the scanner 100 of the image forming system according to the current embodiment of the present disclosure adjusts a feeding interval between scan-target documents, which are fed from the automatic document feeder, to thereby cope with various scan speeds that are requested by the plurality of printers 210, 220, and 230. A method of controlling a scan speed by adjusting the feeding interval is described in detail below.

Figure 2:
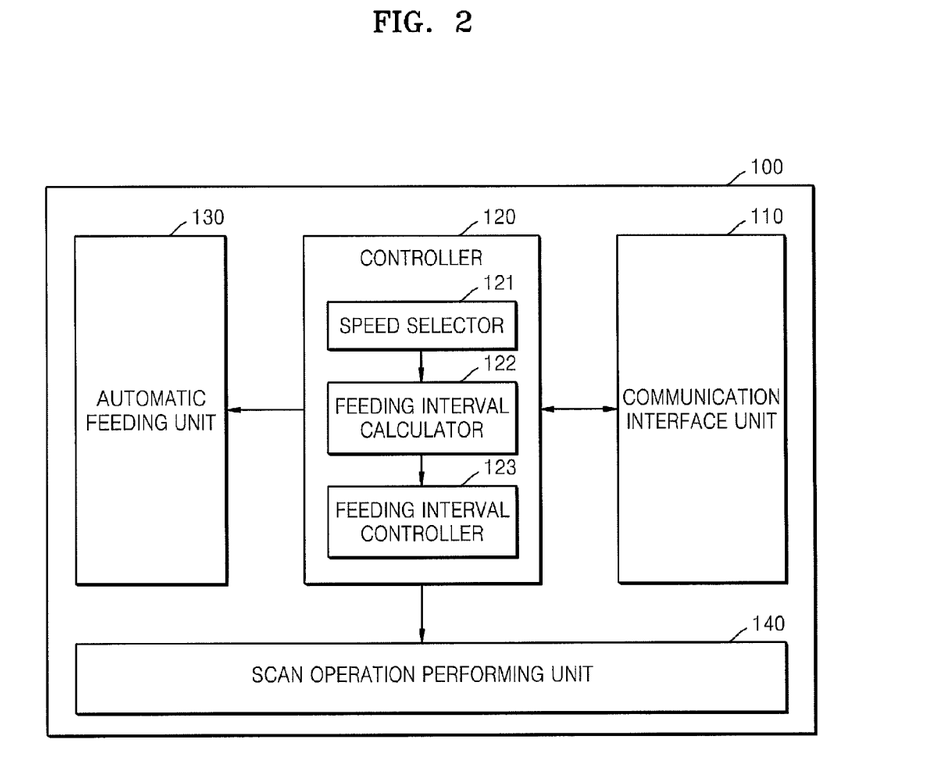
FIG. 2 is an internal block diagram of a scanner including an automatic document feeder according to an embodiment of the present disclosure.

FIG. 2 is an internal block diagram of a scanner 100 including an automatic document feeder according to an embodiment of the present disclosure. Referring to FIG. 2, the scanner 100 may include a communication interface unit 110, a controller 120, an automatic feeding unit 130, and a scan operation performing unit 140. The controller 120 may include a speed selector 121, a feeding interval calculator 122, and a feeding interval controller 123. Detailed operation of each component is described in detail with reference to FIG. 3 below.

Figure 3:
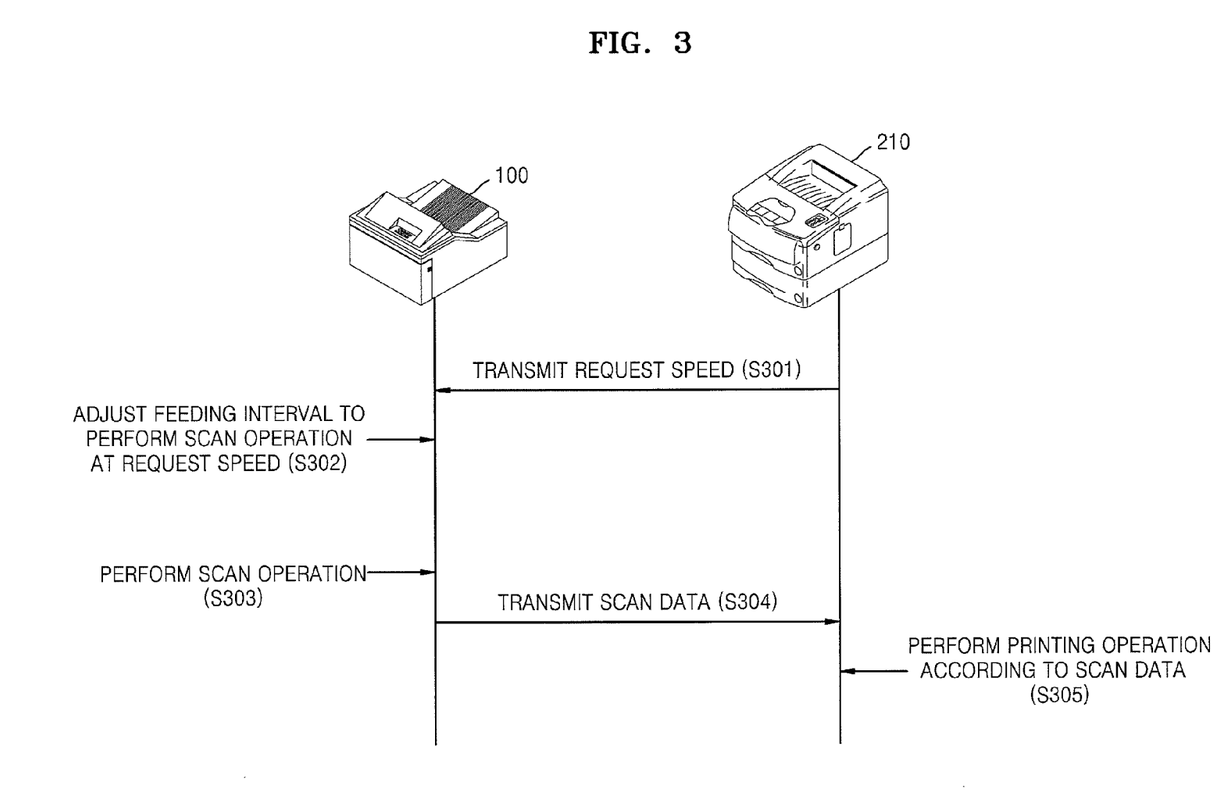
FIG. 3 is a diagram illustrating processes in which a scanner including an automatic document feeder and a printer connected to the scanner perform an image forming operation, according to an embodiment of the present disclosure.

FIG. 3 is a diagram illustrating processes in which a scanner 100 including an automatic document feeder and a printer 210 connected to the scanner 100 perform an image forming operation, according to an embodiment of the present disclosure. Below, an operation of the scanner 100 including the automatic document feeder is described in detail with reference to FIGS. 2 and 3.

In operation S301, the communication interface unit 110 of the scanner 100 receives a request speed for a scan operation from the printer 210. The communication interface unit 110 transmits the received request speed to the controller 120. In operation S302, the controller 120 adjusts a feeding interval between scan-target documents that are automatically fed from the automatic feeding unit 130, so that the scan operation may be performed at the received request speed.

A concrete method of adjusting the feeding interval, which is used in operation S302, is as follows. The speed selector 121 of the controller 120 determines whether there is a basic setting speed corresponding with the received request speed from among basic setting speeds that are supported by the scanner 100. If there is a basic setting speed corresponding with the received request speed, the speed selector 121 selects the basic setting speed and the controller 120 controls the scan operation performing unit 140 to perform a scan operation at the selected basic setting speed.

If there is no basic setting speed corresponding with the received request speed, the speed selector 121 selects a basic setting speed that is higher than the received request speed. In this case, if there are two or more basic setting speeds that are higher than the received request speed, the speed selector 121 may select the lowest basic setting speed from among the two or more basic setting speeds.

If the speed selector 121 selects a higher basic setting speed than the received request speed since there is no basic setting speed corresponding with the received request speed, the feeding interval calculator 122 adjusts a scan speed while maintaining a scan time for each document according to the selected basic setting speed and changing a feeding interval between scan-target documents that are fed from the automatic feeding unit 130, and calculates the feeding interval when the adjusted scan speed corresponds with the received request speed. Since the basic setting speed selected by the speed selector 121 is higher than the request speed, the scan speed gradually decreases when gradually increasing a feeding interval between scan-target documents, which are automatically fed from the automatic feeding unit 130, while maintaining a scan time for each document according to the selected basic setting speed, and in the end, a feeding interval when the request speed and the scan speed correspond with each other may be calculated.

When the feeding interval calculator 122 calculates the feeding interval, the feeding interval controller 123 controls the automatic feeding unit 130 to feed scan-target documents according to the calculated feeding interval. For example, in order to adjust the feeding interval between the scan-target documents, the feeding interval controller 123 moves a pickup roller of the automatic feeding unit 130. The pickup roller is an element which picks the scan-target documents up in the automatic feeding unit 130. The feeding interval controller 123 moves the pickup roller between a position where the pickup roller contacts the scan-target documents and a position where the pickup roller does not periodically contact the scan-target documents according to the calculated feeding interval. The feeding interval between the scan-target documents may be adjusted by adjusting a movement period of the pickup roller according to the calculated feeding interval. In addition, a scan speed controlled by the adjustment of the feeding interval may be transmitted to the printer 210 so that the printer 210 may check a scan speed at which an actual scan operation is performed.

If a scan speed of the scanner 100 corresponds with the request speed received from the printer 210 by the adjustment of the feeding interval, a scan operation is performed at the scan speed (operation S303) and scan data is transmitted to the printer 210 (operation S304). Finally, in operation S305, the printer 210 performs a printing operation according to the scan data.

Figure 4:
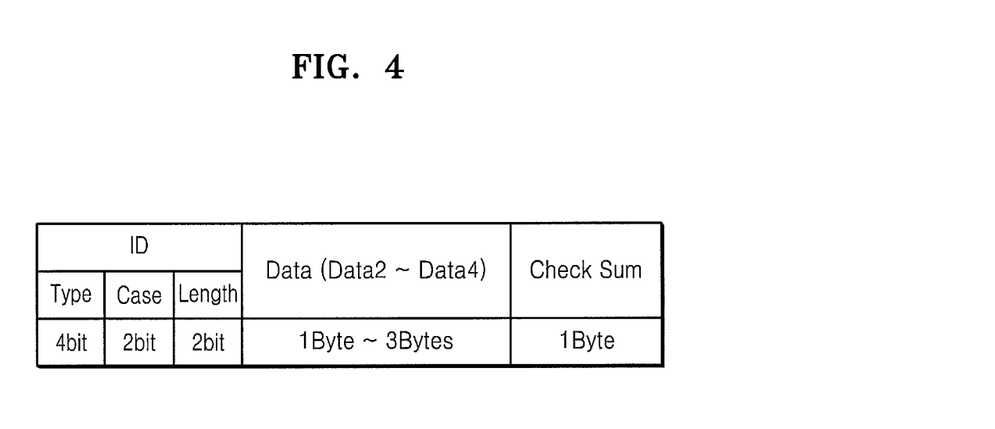
FIG. 4 is a diagram illustrating a structure of a data packet for transmitting a request speed, according to an embodiment of the present disclosure.

The scanner 100 may receive a request speed in a form of data packet from the printer 210. FIG. 4 is a diagram illustrating a structure of a data packet for transmitting a request speed, according to an embodiment of the present disclosure, and FIG. 5 is a diagram illustrating types of data included in the data packet for transmitting the request speed, according to an embodiment of the present disclosure.

Referring to FIG. 4, the data packet for transmitting the request speed may have a structure of 5 bytes. The first byte of the 5 bytes is an identifier (ID) indicating what apparatus the data packet is transmitted from, the second through fourth bytes of the 5 bytes are data included in the data packet, and the fifth byte of the 5 bytes is a check sum indicating whether there is a loss of the data. "Type" of the first byte identifies whether the data packet is transmitted from a scanner, whether the data packet is transmitted from a printer, or whether the data packet is a response to a transmitted packet. "Case" of the first byte is additionally used when it is difficult to identify only with "Type", and "Length" is a length of the entire data.

Figure 5:
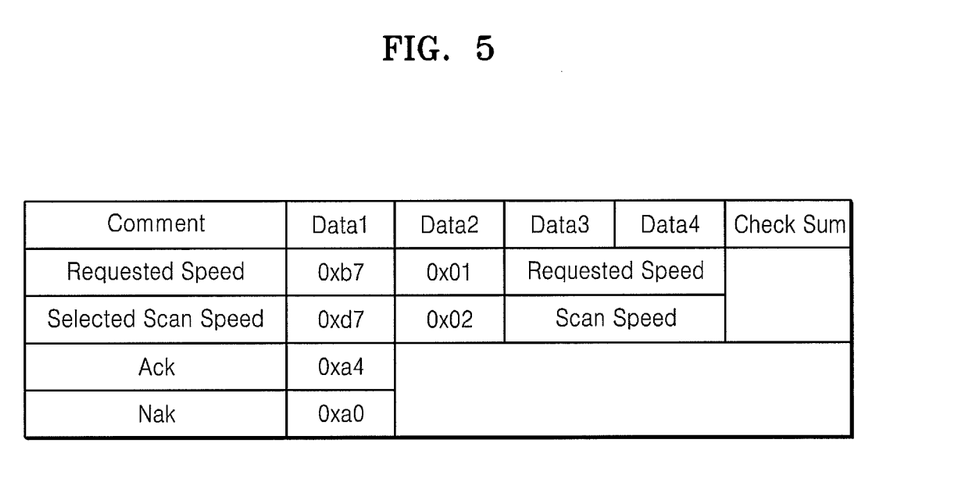
FIG. 5 is a diagram illustrating types of data included in a data packet for transmitting a request speed, according to an embodiment of the present disclosure.

The data that is indicated by the second through fourth bytes includes the types illustrated in FIG. 5. A printer may transmit a request speed by using data corresponding to "Requested Speed", and a scanner may transmit a selected scan speed by using data corresponding to "Selected Scan Speed". In addition, the scanner or the printer checks a check sum of a received data packet, transmits an "Ack" signal if the check sum is normal, and transmits a "Nak" signal if the check sum is abnormal.

Figure 6:
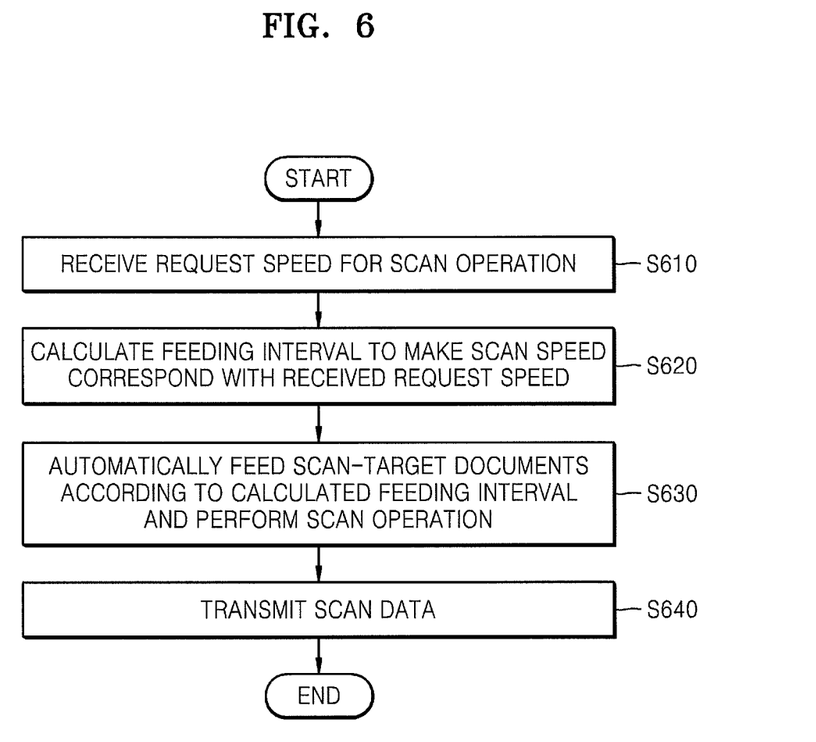
FIGS. 6 and 7 are flowcharts for describing a method of controlling a scan speed of a scanner including an automatic document feeder, according to an embodiment of the present disclosure.
Figure 7:
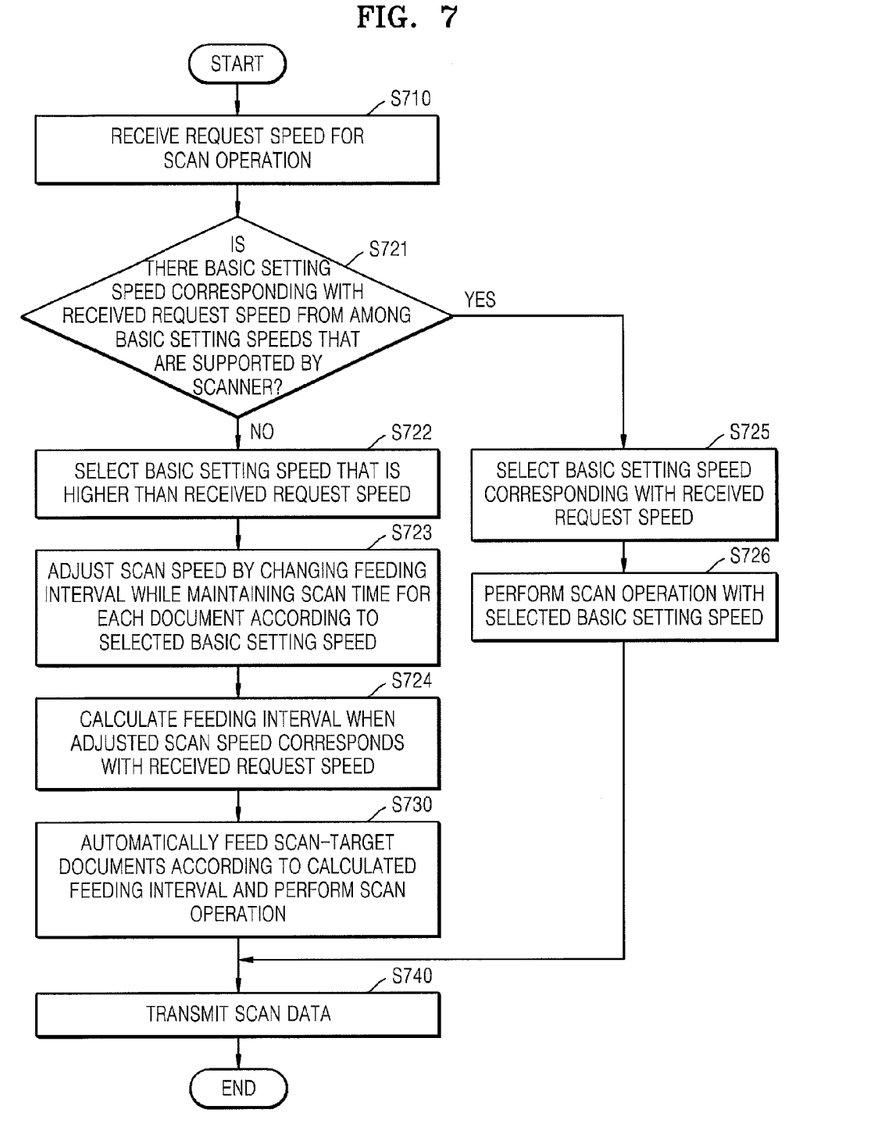

FIGS. 6 and 7 are flowcharts for describing a method of controlling a scan speed of a scanner including an automatic document feeder, according to an embodiment of the present disclosure. Below, the method of controlling a scan speed is described in detail with reference to FIGS. 6 and 7.

Referring to FIG. 6, in operation S610, a scanner receives a request speed for a scan operation from a printer. If the request speed is received, the scanner calculates a feeding interval to make a scan speed of the scanner correspond with the received request speed (operation S620). The feeding interval means an interval with which scan-target documents are automatically fed from the automatic document feeder included in the scanner. By adjusting the feeding interval between the scan-target documents that are fed from the automatic document feeder included in the scanner, the scan speed of the scanner may be controlled. Accordingly, a feeding interval when the scan speed of the scanner corresponds with the received request speed may be calculated. A concrete method of calculating a feeding interval is described with reference to FIG. 7 below.

Subsequently, in operation S630, the scan-target documents are automatically fed according to the feeding interval calculated in operation S620, and a scan operation is performed. For example, in order to adjust the feeding interval between the scan-target documents, a pickup roller of the automatic feeding unit is periodically moved. The pickup roller is an element which picks the scan-target documents up in the automatic feeding unit of the scanner. The pickup roller is moved between a position where the pickup roller contacts the scan-target documents and a position where the pickup roller does not periodically contact the scan-target documents periodically according to the calculated feeding interval. The feeding interval between the scan-target documents may be adjusted by adjusting a movement period of the pickup roller according to the calculated feeding interval. When the scan operation is completed, the scanner transmits scan data, which is a result obtained by the scan operation, to the printer (operation S640).

FIG. 7 is a flowchart illustrating detailed operations of operation S620 of FIG. 6, in which the feeding interval is calculated. Referring to FIG. 7, in operation S710, the scanner receives a request speed for a scan operation from the printer. If the request speed is received, the scanner determines whether there is a basic setting speed corresponding with the received request speed from among basic setting speeds that are supported by the scanner (operation S721). The basic setting speed means a scan speed which the scanner basically supports without adjusting the feeding interval between the scan-target documents.

If in operation S721, it is determined that there is a basic setting speed corresponding with the received request speed, the basic setting speed corresponding with the received request speed is selected in operation S725. Next, in operation S726, a scan operation is performed with the selected basic setting speed. Finally, in operation S740, scan data is transmitted.

If in operation S721, it is determined that there is no basic setting speed corresponding with the received request speed, a basic setting speed that is higher than the received request speed is selected in operation S722. In this case, if there are two or more basic setting speeds that are higher than the received request speed, the lowest basic setting speed from among the two or more basic setting speeds may be selected.

If the basic setting speed is selected in operation S722, a scan speed is adjusted by changing the feeding interval while maintaining a scan time for each document according to the selected basic setting speed (operation S723). Subsequently, in operation S724, the feeding interval when the adjusted scan speed corresponds with the received request speed is calculated. Since the basic setting speed selected in operation S722 is higher than the received request speed, the scan speed gradually decreases when gradually increasing the feeding interval between the scan-target documents, which are automatically fed from the automatic feeding unit of the scanner, while maintaining a scan time for each document according to the selected basic setting speed, and in the end, a feeding interval when the request speed and the scan speed correspond with each other may be calculated.

If the feeding interval is calculated, scan-target documents are automatically fed according to the calculated feeding interval and a scan operation is performed at an adjusted scan speed (operation S730). Next, in operation S740, scan data is transmitted to the printer.

In this manner, a scan speed may be controlled in response to a request of various scan speeds by adjusting a feeding interval between scan-target documents that are fed by an automatic document feeder of a scanner, and thus, an operation efficiency of the image forming system may be improved.

According to another embodiment of the present disclosure, a feeding interval may be also adjusted in a multi-function printer (MFP) including a printing unit and a scanning unit, in which a printing speed which is supported by the printing unit does not correspond with a scan speed that is supported by the scanning unit.

Figure 8:
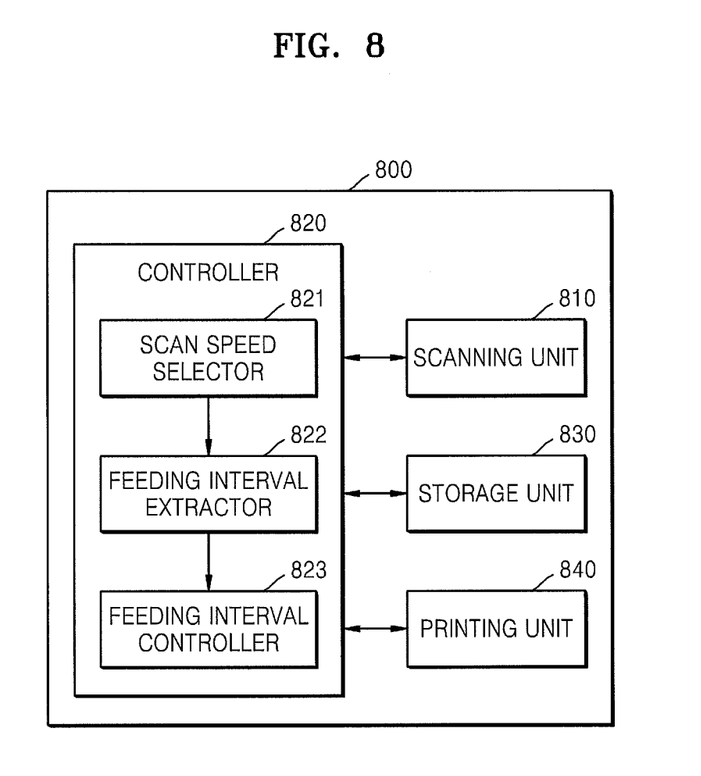
FIG. 8 is a block diagram of a multi-function printer (MFP) according to an embodiment of the present disclosure.
Figure 9:
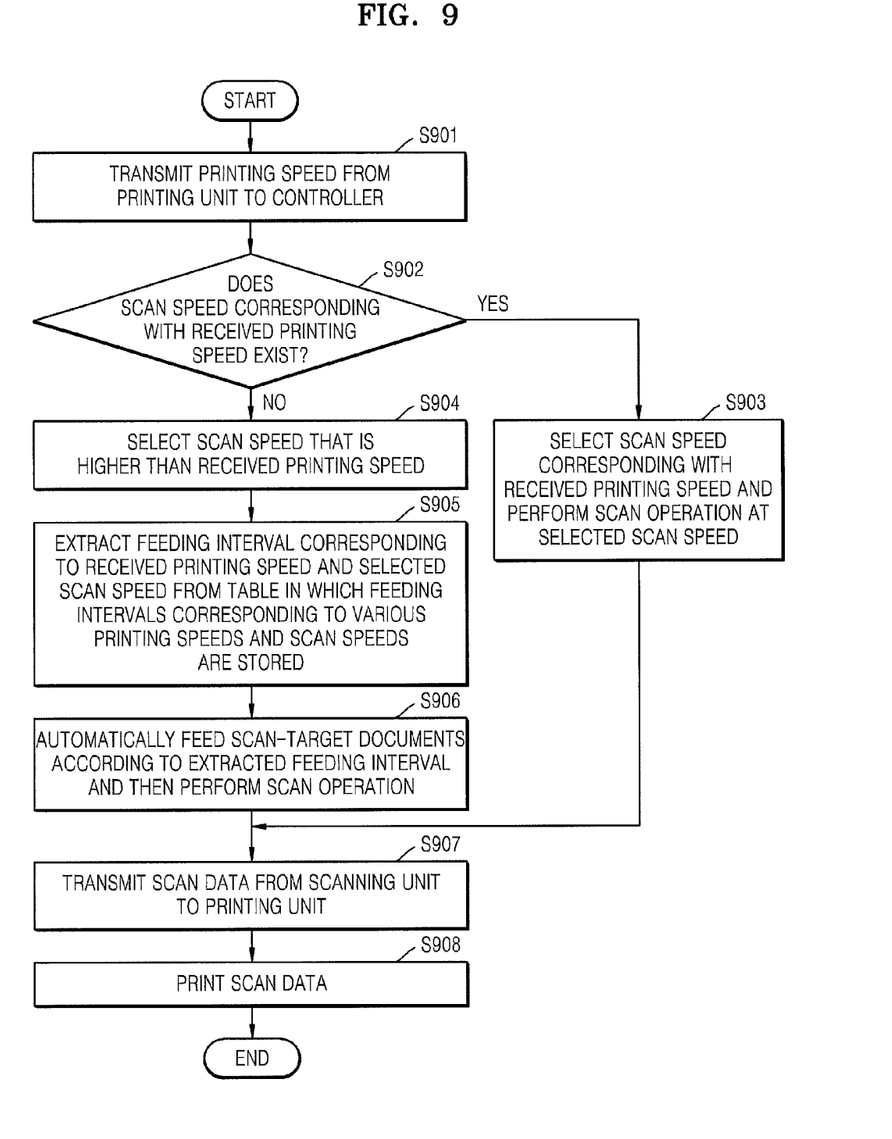
FIG. 9 is a flowchart illustrating a method of controlling a scan speed in the MFP of FIG. 8, according to an embodiment of the present disclosure.

FIG. 8 is a block diagram of a MFP according to an embodiment of the present disclosure, and FIG. 9 is a flowchart illustrating a method of controlling a scan speed in the MFP of FIG. 8, according to an embodiment of the present disclosure.

Below, the method of controlling a scan speed of the MFP with reference to FIGS. 8 and 9 is described.

Referring to FIG. 8, the MFP 800 may include a scanning unit 810, a controller 820, a storage unit 830, and a printing unit 840, and the controller 820 may include a scan speed selector 821, a feeding interval extractor 822, and a feeding interval controller 823.

The scanning unit 810 and the printing unit 840 each support a plurality of scan speeds and a plurality of printing speeds. However, the plurality of printing speeds that are supported by the printing unit 840 do not necessarily correspond with the plurality of scan speeds that are supported by the scanning unit 810. That is, some of the plurality of printing speeds that are supported by the printing unit 840 may not correspond with the plurality of scan speeds that are supported by the scanning unit 810. For example, the printing unit 840 may support first through sixth speeds as the printing speeds, and the scanning unit 810 may support only the first, third, and sixth speeds of the first through sixth speeds as the scan speeds.

When performing an image forming operation in which the printing unit 840 prints image data scanned by the scanning unit 810, if a printing speed of the printing unit 840 does not correspond with a scan speed of the scanning unit 810, an operational efficiency may deteriorate. Accordingly, in this case, by adjusting an automatic feeding interval in the scanning unit 810, the scan speed of the scanning unit 810 is adjusted to correspond with the printing speed of the printing unit 840. A detailed process of adjusting the scan speed is described with reference to FIG. 9 below.

Referring to FIG. 9, in operation S901, the printing unit 840 transmits a printing speed, which is required to perform a printing operation, to the controller 820. In operation S902, the controller 820 determines whether a scan speed corresponding with a received printing speed exists. That is, the controller 820 determines whether the scanning unit 810 supports a scan speed corresponding with the received printing speed. If a scan speed corresponding with the received printing speed exists, the scan speed selector 821 selects the scan speed corresponding with the received printing speed and the scanning unit 810 performs a scan operation at the selected scan speed (operation S903). However, if a scan speed corresponding with the received printing speed does not exist, the scan speed selector 821 selects a scan speed that is higher than the received printing speed (operation S904).

For example, if the printing speed transmitted in operation S901 is the first speed in a state in which it is assumed that the printing unit 840 supports the first through sixth speeds as the printing speeds and the scanning unit 810 supports only the first, third, and sixth speeds as the scan speeds, the scan speed selector 821 selects the first speed as a scan speed and the scanning unit 810 performs a scan operation (operation S903). However, if the printing speed transmitted in operation S901 is the second speed, the scan speed selector 821 selects the third speed, which is higher than the second speed, as a scan speed since the scanning unit 810 does not support the second speed (operation S904). In this case, it is assumed that speed becomes gradually higher from the first speed toward the sixth speed.

Next, in operation S905, the feeding interval extractor 822 of the controller 820 extracts a feeding interval corresponding to a received printing speed and a selected scan speed from a table in which feeding intervals corresponding to various printing speeds and scan speeds are stored. The table, in which feeding intervals corresponding to various printing speeds and scan speeds are stored, is stored in the storage unit 830 beforehand. For example, a feeding interval that should be adjusted to make a scan speed correspond with a printing speed when the printing speed is the second speed and the scan speed is the third speed, is calculated beforehand and then stored in the table. Similarly, various feeding intervals, which correspond to a plurality of scan speeds, which are supported by the scanning unit 810, and a plurality of printing speeds, which are supported by the printing unit 840, are calculated beforehand and then stored in the table. Accordingly, the feeding interval extractor 822 may extract a feeding interval, which corresponds to the printing speed received in operation S901 and the scan speed selected in operation S904, from the table stored in the storage unit 830.

If a feeding interval is extracted in operation S905, the scanning unit 810 automatically feeds scan-target documents according to the extracted feeding interval and then performs a scan operation (operation S906). If the scan operation is completed, the scanning unit 810 transmits scan data to the printing unit 840 (operation S907), and then the printing unit 840 prints the scan data received from the scanning unit 810 (operation S908).

While the present disclosure has been particularly shown and described with reference to exemplary embodiments thereof, it will be understood by those of ordinary skill in the art that various changes in form and details may be made therein without departing from the spirit and scope of exemplary embodiments of the present general inventive concept as defined by the following claims.

What is claimed is:

1. A scanner comprising an automatic document feeder, the scanner comprising:
    a communication interface unit to perform a communication with an external printer;
    a scan operation performing unit to perform a scan operation;
    an automatic feeding unit to automatically feed scan-target documents to the scan operation performing unit; and
    a controller to control the scan operation and a scan speed, wherein when the communication interface unit receives a request speed for a scan operation from the external printer, the controller adjusts a feeding interval between the scan-target documents that are fed from the automatic feeding unit, so that the scan operation is performed at the received request speed.

2. The scanner of claim 1, wherein the controller comprises:
    a feeding interval calculator to calculate the feeding interval between the scan-target documents to make a scan speed of the scanner correspond with the received request speed; and
    a feeding interval controller to control the automatic feeding unit to feed the scan-target documents according to the calculated feeding interval.

3. The scanner of claim 2, wherein the controller further comprises a speed selector to determine whether there is a basic setting speed corresponding with the received request speed from among one or more basic setting speeds which are supported by the scanner and select a basic setting speed, which is higher than the received request speed, if it is determined that there is no basic setting speed corresponding with the received request speed,
    wherein the feeding interval calculator calculates the feeding interval when the scan speed corresponds with the received request speed while maintaining a scan time for each document according to the basic setting speed selected by the speed selector.

4. The scanner of claim 3, wherein when there are two or more basic setting speeds that are higher than the received request speed, the speed selector selects the lowest basic setting speed from among the two or more basic setting speeds.

5. The scanner of claim 3, wherein the basic setting speed is a scan speed which the scanner supports without adjusting the feeding interval.

6. The scanner of claim 3, wherein the communication interface unit transmits a scan speed adjusted according to the calculated feeding interval to the printer.

7. The scanner of claim 1, wherein the communication interface unit receives a scan speed corresponding to a printing speed of the printer as the request speed.

8. The scanner of claim 7, wherein the communication interface unit receives a data packet comprising the request speed from the printer, and the data packet comprises an identifier (ID) indicating what apparatus the data packet is transmitted from, data indicating a speed, and a check sum indicating whether there is a loss of the data.

9. The scanner of claim 1, wherein the automatic feeding unit comprises a pickup roller that picks the scan-target documents up, and the feeding interval controller adjusts a cycle, on which the pickup roller contacts the scan-target documents, according to the calculated feeding interval.

10. A method of controlling a scan speed of a scanner comprising an automatic document feeder, the method comprising:
    receiving a request speed for a scan operation from an external printer;
    calculating a feeding interval between scan-target documents to make the scan speed of the scanner correspond with the received request speed;
    performing a scan operation by automatically feeding the scan-target documents according to the calculated feeding interval; and
    transmitting a result obtained by the scan operation to the printer.

11. The method of claim 10, wherein the calculating of the feeding interval comprises:
    determining whether there is a basic setting speed corresponding with the received request speed from among one or more basic setting speeds that are supported by the scanner;

if it is determined that there is no basic setting speed corresponding with the received request speed, selecting a basic setting speed that is higher than the received request speed;

adjusting a scan speed by changing the feeding interval while maintaining a scan time for each document according to the selected basic setting speed; and calculating the feeding interval when the adjusted scan speed corresponds with the received request speed.

12. The method of claim 11, wherein the selecting of the basic setting speed comprises:

if there are two or more basic setting speeds that are higher than the received request speed, selecting the lowest basic setting speed from among the two or more basic setting speeds.

13. The method of claim 11, wherein the basic setting speed is a scan speed which the scanner supports without adjusting the feeding interval.

14. The method of claim 11, further comprising transmitting a scan speed adjusted according to the calculated feeding interval to the printer.

15. The method of claim 10, wherein the receiving of the request speed comprises receiving a scan speed corresponding to a printing speed of the printer as the request speed.

16. The method of claim 15, wherein the receiving of the request speed comprises receiving a data packet comprising the request speed from the printer, wherein the data packet comprises an identifier (ID) indicating what apparatus the data packet is transmitted from, data indicating a speed, and a check sum indicating whether there is a loss of the data.

17. The method of claim 10, wherein the performing of the scan operation comprises adjusting a cycle, on which a pickup roller for picking the scan-target documents up from the automatic document feeder contacts the scan-target documents, according to the calculated feeding interval.

18. A non-transitory computer readable recording medium having recorded thereon a program for executing the method of claim 10.

19. A multi-function printer (MFP) comprising:
a scanning unit;
a controller;
a storage unit;
a printing unit; and
a controller to adjust an automatic feeding interval in the scanning unit whereby the scan speed of the scanning unit is adjusted to correspond with a printing speed of the printing unit.

20. The MFP of claim 19, wherein the controller includes a scan speed selector, a feeding interval extractor, and a feeding interval controller.

21. The MFP of claim 20, wherein the controller is configured to determine whether a scan speed corresponding with a received printing speed exists, and if a scan speed corresponding with a received printing speed does exist, the scan speed selector is configured to select the scan speed corresponding with the received printing speed, and if a scan speed corresponding with the received printing speed does not exist, the scan speed selector is configured to select a scan speed that is higher than the received printing speed.

22. The MFP of claim 21, wherein the feeding interval extractor is configured to extract a feeding interval corresponding to a received printing speed and a selected scan speed from a table stored in the storage unit in which feeding intervals corresponding to various printing speeds and scan speeds are stored.

* * * * *